United States Patent Office 3,101,155
Patented Aug. 20, 1963

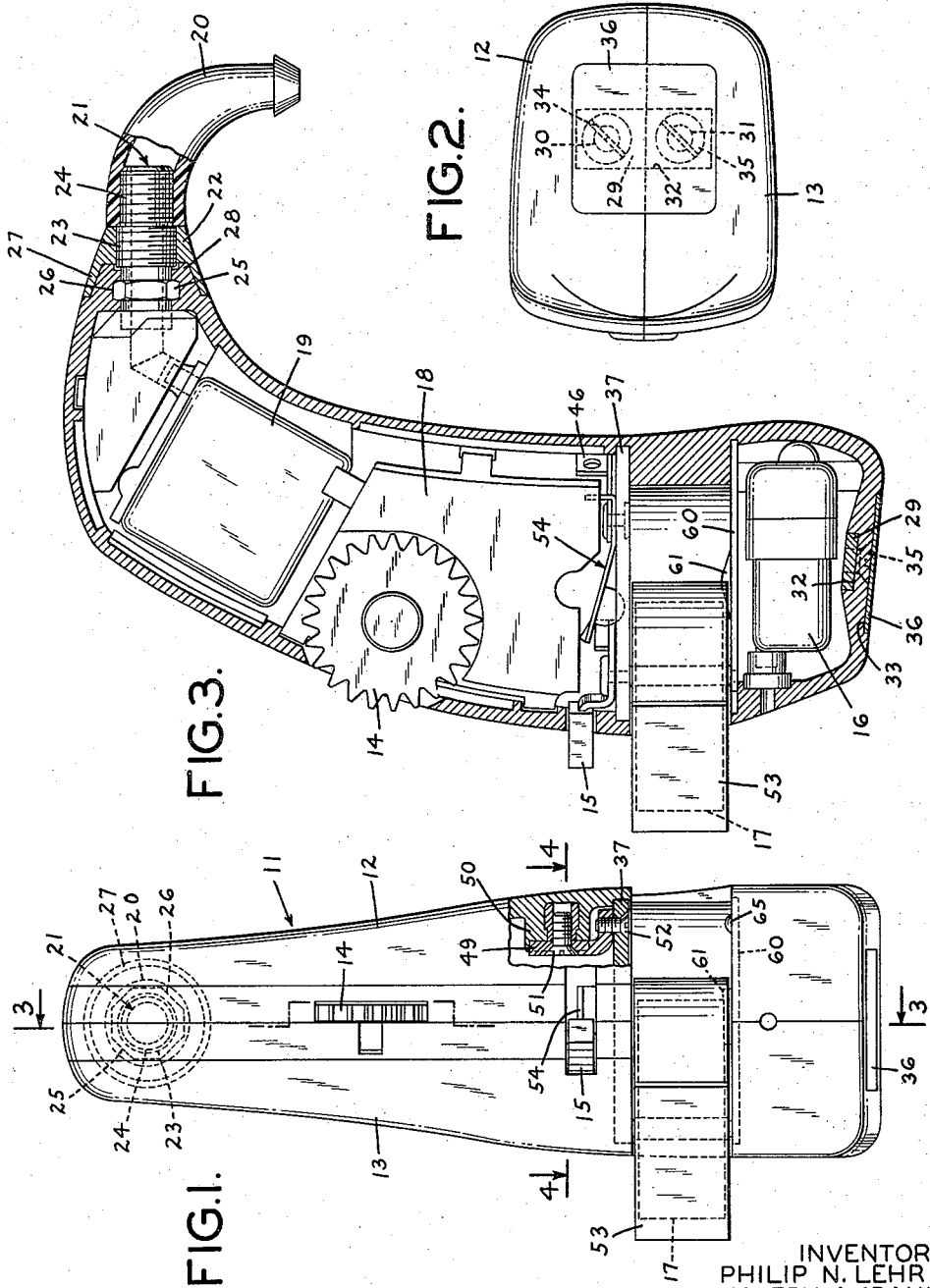

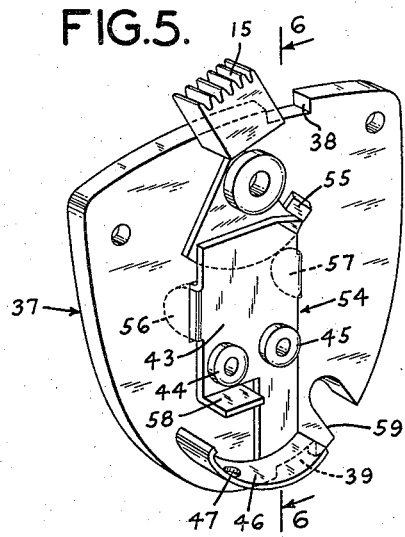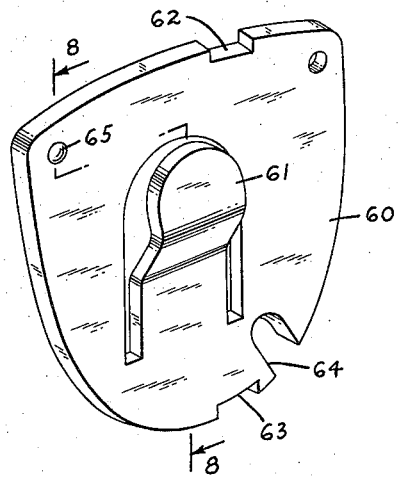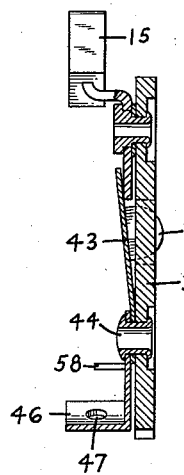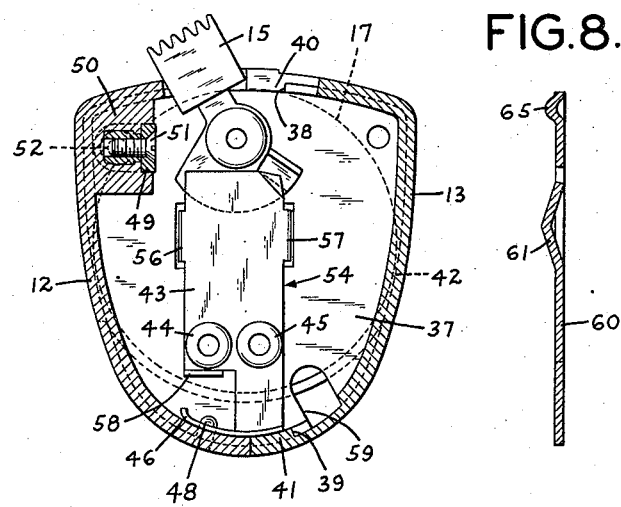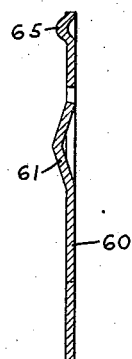

3,101,155
COMPACT HOUSING
Philip N. Lehr, Huntington, and Joseph A. Idank, Richmond Hill, N.Y., assignors to Dictograph Products, Inc., Jamaica, N.Y., a corporation of Delaware
Filed Mar. 14, 1961, Ser. No. 95,586
3 Claims. (Cl. 220—4)

This invention relates to housings, and, more particularly, to housings fabricated without the use of external fastenings or attachments that are not part of the housings themselves.

In the design of housings for compact equipment, and particularly in the design of hearing aid units, much attention has been directed toward making such equipment pleasing in appearance to blend in with environmental conditions. However, typical fabrication procedures generally have led to the use of external attachments and fastenings in the assembly of such housings. For example, screws are normally used that are passed through the particular housing, thus leaving the heads of the screws on the outside of the housing, which leads to an unsightly appearance. Where such fastenings have been dispensed with, the parts forming a housing have been glued together. Such a fabrication procedure, however, usually precludes simple and non-destructive dismantling of the housing for repair.

In the present invention, the use of external screws and bothersome gluing procedures is successfully avoided in the fabrication of a housing. In an exemplary embodiment of the invention, a hearing aid enclosure, designed for behind-the-ear use, is formed from two shells. One pair of ends of the shells are joined together by the use of a screw having a flanged portion thereon that fits into associated grooves in the insides of the ends of the shells. A threaded cap is threaded onto the screw and completely covers the ends of the shells, thereby fastening together these ends and forming a smooth, integral, and single surface with the outside surfaces of the shells.

The other ends of the shells are fastened together by a tie bar that is set into a groove on the insides of each of the shells. The outsides of the shells opposite the grooves are cut away to allow screws to be threaded through the shells and into the tie bar, thus holding the shells together. The screws are recessed, and a covering plate is lightly cemented over the heads of the screws in order to conceal them.

The center portions of the shells are held together by an attachment plate which is attached to one of the shells on an inside portion of the shell. The other shell is attached to the attachment plate by fastenings provided on the inside thereof. Such fastenings are accessible by virtue of openings in the shells, e.g., openings to accommodate a battery for the hearing aid unit. Thus, the attachment plate and interior fastenings are completely hidden from view.

While the features of the present invention have been set forth generally above, a better understanding of the invention may be obtained by consulting the following detailed description, when taken in conjunction with the appended drawings, in which:

FIGURE 1 is a partly cut-away end view of an exemplary embodiment of this invention;

FIG. 2 is a bottom view of the structure of FIGURE 1;

FIG. 3 is a sectional side view of the structure of FIGURE 1 taken generally along the line 3—3 of that figure, looking in the direction of the arrows;

FIG. 4 is a sectional top view of the structure of FIG. 1 taken generally along the line 4—4 of that figure, looking in the direction of the arrows;

FIG. 5 is a pictorial view of the attachment plate used to join the center portions of the two shells that comprise the case of FIG. 1;

FIG. 6 is a sectional side view of the attachment plate of FIG. 5 taken generally along the line 6—6 of that figure, looking in the direction of the arrows;

FIG. 7 is a pictorial view of a battery plate contained within the structure of FIG. 1; and FIG. 8 is a sectional side view of the battery plate of FIG. 7 taken generally along the line 8—8 of that figure, looking in the direction of the arrows.

Referring now to FIG. 1, a hearing aid enclosure 11, suitable for being worn behind the ear, is composed of a pair of shells 12 and 13. A circular knob 14 protruding from the shells is suitable for controlling the volume of the hearing aid unit, while another knob 15 serves to control an on-off switch 54.

FIG. 3 depicts the general shape of the shells and also depicts the placement of the electronic structure contained within the case. A microphone 16 is suitably placed within the lower portion of the case, while a battery 17, an amplifying unit 18, and a further unit 19 are neatly positioned at various other locations within the case. Signals from the unit 19, which in this instance is a further amplifying unit, are coupled to a small loudspeaker (not shown) that is placed within the ear of the user by electrical leads (not shown) that pass through a nozzle 20 at the tip of the case. The unit 19, however, may just as well comprise a transducer, such as a loudspeaker, e.g., in which case sound waves would pass through the nozzle 20.

As seen in FIGS. 1, 2, and 3, the two shells comprising the hearing aid case are fastened together at their top portions by a specially constructed screw 21 and an associated cap 22, at their bottom portions by a tie bar 29 and a pair of screws 34 and 35, and at their mid portions by an attachment plate 37 which also serves to support the on-off switch 54.

The fastening together of the top portions of the shells 12 and 13 by the use of the screw 21 and its associated cap 22 is best shown in FIGS. 1 and 3. The screw itself is composed of two threaded portions 23 and 24 along with a square-shaped or polygon-shaped flange 25. As shown in FIG. 3, the screw 21 is hollow to permit the passage of either electrical leads (not shown) or sound waves therethrough.

The angled flange portion 25 of the screw 21 fits into an associated groove 26 contained on the inside of each one of the shells, and the screw is thus prevented from rotating. The cap 22, threaded onto the screw 21, itself contains a flanged portion 27. This flanged portion fits around a cut-away portion 28 of the shells, and thus, when the cap is screwed into place, the two shells are held firmly together.

Due to the cutting away of the shells to produce the portion 28, the outside of the cap 22 smoothly forms one continuous surface with the outside surfaces of the shells. Thus, cap 22 firmly joins the two shells together, and still retains a pleasing appearance.

As shown in FIG. 3, a nozzle 20 is fastened to the threaded portion 24 of screw 21. This nozzle serves both to guide either electrical leads (not shown) or sound waves to the ear of the user, and also to facilitate in the retention of the entire hearing air snugly behind the user's ear.

The fastening together of the bottom portions of the two shells forming the enclosure is best seen in FIGS. 2 and 3. The tie bar 29 containing two threaded holes 30 and 31 is placed into a groove 32 in the bottom portions of the shells on the insides thereof. The outsides of the shells are cut away to produce a recessed surface 33 and, further, the shells are drilled through to accommodate the screws 34 and 35 that pass through the shells and which are threaded into the tie bar 29. In this fashion, the two shells are held together, and a covering plate 36, glued within the recessed portions 33 of the shells, is used to cover the heads of the screws.

The middle portions of the two shells are fastened together by the attachment plate 37. The details of the plate itself are shown in FIGS. 5 and 6, whereas the mounting of the plate in the shells is best shown in FIGS. 1, 3, and 4.

Referring to FIG. 5, the attachment plate 37, which suitably may be of plastic or other insulating material, is notched to produce a pair of cut-away portions 38 and 39. These notches are placed into a pair of corresponding keys 40 and 41 contained in the shell 13, as shown in FIG. 4, thus rigidly fastening the plate to the shell. Further, shell 13 is grooved, as at 42, to accommodate the plate 37, and thus glue or other adhesive material placed within the groove may be used to bind firmly the plate 37 to the shell 13.

As may be seen from FIG. 5, a plate 43 is attached to the attachment plate 37 by a pair of rivets 44 and 45. The plate 43 contains a spring-like plate 46 attached thereto containing a hole 47 drilled therethrough. In order to join the shell 12 to the spring plate 46 (FIG. 4), a small pin 48 is attached to the shell 12 which passes through a hole 47 in the spring plate.

Further attachment of the shell 12 to the attachment plate 37 is accomplished by a joining plate 49, best seen in FIGS. 1 and 4, which is fastened to a protruding portion 50 of the shell by a screw 51. The joining plate 49 and the attachmenut plate 37 are attached together by a screw 52 that is threaded into a hole in the joining plate. The screw 52 is easily accessible since it is reached through an opening in the shells provided for a battery door 53.

As shown in FIG. 5, the attachment plate 37 also contains the on-off switch 54 that comprises the knob 15 which controls the movement of a cam-type projection 55. The projection 55 causes the plate 43, formed from an electrical conducting material, to move away from and toward the attachment plate 37. Contact to the battery 17 lying below the plate 37 (FIG. 3) is made by two tabs 56 and 57 (FIG. 5) which are attached to the plate 43 and which extend through the attachment plate 37. Electrical contact to the on-off switch in turn may be made by soldering, e.g., an electrical lead (not shown) to a lip 58. Further, a cut-out portion 59 in the attachment plate 37 is utilized to allow the passage of electrical leads (not shown) through the plate.

A lower battery plate 60 for supporting and providing contact to the battery 17 used in the hearing aid unit is shown in detail in FIGS. 7 and 8 and in place within the enclosure in FIGS. 1 and 3. The plate has a raised lip portion 61 which contacts one of the terminals of the battery. Provided in the plate are a pair of grooves or notches 62 and 63 which fit into corresponding keys in the shell 13 in order to fasten the plate to the shell. As with the attachment plate 37, the lower battery plate is inserted into grooves in the two shells 12 and 13 in order to secure the plate thereto. A large cutout 64 is also provided in the plate for the passage of electrical leads (not shown) therethrough.

The lower battery plate 60 is also provided with a small boss 65 which is used to make a pressure contact with the hinged-battery door 53 shown in FIG. 1. By virtue of the slight pressure exerted by the battery door against the boss, the door is retained in a closed position and is prevented from swinging open.

As may be seen from the description above, a hearing aid case constructed as outlined uses no external fastenings that are not part of the unit itself as, for example, the threaded cap smoothly and unnoticeably joining the upper portions of the two shells. Otherwise, no exposed fastenings are employed, and thus a housing is fabricated which is durable, easily constructed, easily dismantled, and pleasing in its appearance.

From the detailed description above, it is apparent that numerous additions, substitutions, and modifications may be made changing the embodiment described, without departing, however, from the spirit of the invention. Such changes, then, should be deemed to be covered by the following claims, which are set forth to define the novel type of housing invented.

We claim:
1. A housing, comprising a first shell containing at least one key in an inside portion thereof, a second shell containing both a pin in a first inside portion thereof and a joining plate with a threaded hole therein on a second inside portion thereof, an attachment plate for joining said first and said second shells to form a closed housing, said attachment plate being notched along its edge in the shape of said key to be retained by said key against said first shell, said attachment plate having a spring plate thereon with a first drilled portion in said spring plate for placement around said pin, said attachment plate further having a second drilled portion therein in substantial alignment with said threaded hole of said joining plate thereby to receive a threaded member to secure said attachment plate to said joining plate.

2. A housing, comprising a first shell and a second shell, a groove extending laterally around the inside of each shell at the mid region thereof, a pair of keys on the inside of said first shell extending longitudinally thereon, a pin attached to said second shell on the inside thereof, a joining plate attached to said second shell on the inside thereof having a threaded hole therein, an attachment plate fitted into said grooves containing notches embracing said keys, a spring plate attached to said attachment plate and containing a hole therein that encompasses said pin, and a screw passing through a hole in said attachment plate and threaded into said threaded hole in said joining plate to join said attachment plate and said joining plate.

3. In an enclosure, including a first shell and a second shell, the combination therewith for joining said shells to fabricate a closed housing, comprising an attachment plate rigidly attached to the inside of said first shell, a spring plate attached to said attachment plate and containing a hole therein, a pin attached to the inside of said second shell and passing through said hole in said spring plate, a joining plate attached to the inside of said second shell and containing a threaded hole therein, a hole in said attachment plate aligned with said threaded hole, and a threaded member threaded into said threaded hole through said hole in said attachment plate to join said attachment and said joining plates.

References Cited in the file of this patent
UNITED STATES PATENTS

| | | |
|---|---|---|
| 2,567,686 | Benander | Sept. 17, 1931 |
| 2,533,431 | Chausson | Dec. 12, 1950 |
| 2,736,451 | Fogg | Feb. 28, 1956 |
| 2,741,499 | Kussmaul | Apr. 10, 1956 |
| 2,814,866 | Bagno | Dec. 3, 1957 |
| 2,991,333 | Rose | July 4, 1961 |
| 3,019,306 | Weiss | Jan. 30, 1962 |

FOREIGN PATENTS

| | | |
|---|---|---|
| 1,130,943 | France | Oct. 8, 1956 |